(12) United States Patent
Suzuki (10) Patent No.: US 11,971,617 B2
(45) Date of Patent: Apr. 30, 2024

(54) FARADAY ROTATOR AND MAGNETO-OPTICAL ELEMENT

(71) Applicant: NIPPON ELECTRIC GLASS CO., LTD., Otsu (JP)

(72) Inventor: Futoshi Suzuki, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 683 days.

(21) Appl. No.: 17/048,117

(22) PCT Filed: Mar. 7, 2019

(86) PCT No.: PCT/JP2019/009034
§ 371 (c)(1),
(2) Date: Oct. 16, 2020

(87) PCT Pub. No.: WO2019/225116
PCT Pub. Date: Nov. 28, 2019

(65) Prior Publication Data
US 2021/0165252 A1 Jun. 3, 2021

(30) Foreign Application Priority Data
May 25, 2018 (JP) .................................. 2018-100381

(51) Int. Cl.
*G02F 1/09* (2006.01)
*C03C 3/15* (2006.01)
(Continued)

(52) U.S. Cl.
CPC ................ *G02F 1/093* (2013.01); *C03C 3/15* (2013.01); *C03C 4/00* (2013.01); *G02B 27/28* (2013.01); *G02F 2202/09* (2013.01)

(58) Field of Classification Search
CPC .. C03C 3/15; C03C 4/00; G02B 27/28; G02B 6/2746; G02F 2202/09; G02F 1/09;
(Continued)

(56) References Cited

U.S. PATENT DOCUMENTS

2005/0225831 A1* 10/2005 Fehn ....................... G02F 1/093
359/280
2008/0165418 A1 7/2008 Scerbak et al.
(Continued)

FOREIGN PATENT DOCUMENTS

CN 210155361 U 3/2020
JP 2009-229802 A 10/2009
(Continued)

OTHER PUBLICATIONS

Official Communication issued in corresponding Chinese Patent Application No. 201910437871.2, dated May 5, 2022.
(Continued)

*Primary Examiner* — Derek S. Chapel
(74) *Attorney, Agent, or Firm* — Keating & Bennett, LLP (57) ABSTRACT

A Faraday rotator includes a magnetic circuit including first to third magnetic materials each provided with a through hole through which light passes, and a Faraday element disposed in the through hole. When a direction where light passes through the through hole is defined as a direction of an optical axis, the first magnetic material is magnetized in a direction perpendicular to the direction of the optical axis, the second magnetic material is magnetized in a direction parallel to the direction of the optical axis, and the third magnetic material is magnetized in a direction perpendicular to the direction of the optical axis, and a length of the Faraday element along the direction of the optical axis is shorter than a length of the second magnetic material along the direction of the optical axis.

8 Claims, 3 Drawing Sheets

(51) Int. Cl.
*C03C 4/00* (2006.01)
*G02B 27/28* (2006.01)

(58) Field of Classification Search
CPC .......... G02F 1/092; G02F 1/093; G02F 1/095; G02F 1/0955
See application file for complete search history.

(56) References Cited

U.S. PATENT DOCUMENTS

| | | |
|---|---|---|
| 2009/0237771 A1 | 9/2009 | Nakamura et al. |
| 2015/0198823 A1* | 7/2015 | Ebenwalder ............ G02F 1/093 |
| | | 359/484.03 |
| 2018/0186683 A1 | 7/2018 | Suzuki |
| 2020/0033647 A1 | 1/2020 | Suzuki |
| 2021/0165252 A1 | 6/2021 | Suzuki |
| 2021/0231983 A1* | 7/2021 | Suzuki ...................... C03C 3/15 |
| 2023/0168525 A1* | 6/2023 | Suzuki ...................... H01F 7/02 |
| | | 359/484.03 |

FOREIGN PATENT DOCUMENTS

| | | | | |
|---|---|---|---|---|
| JP | 2012-068598 A | | 4/2012 | |
| JP | 2012068598 A | * | 4/2012 | ............. G02F 1/093 |
| JP | 2016-109743 A | | 6/2016 | |
| JP | 2016109743 A | * | 6/2016 | |
| JP | 2017-061389 A | | 3/2017 | |
| JP | 2017061389 A | * | 3/2017 | ........... C03B 19/063 |
| JP | 2018-072384 A | | 5/2018 | |
| JP | 2018-080066 A | | 5/2018 | |

OTHER PUBLICATIONS

Official Communication issued in International Patent Application No. PCT/JP2019/009034, dated May 21, 2019.

* cited by examiner

FARADAY ROTATOR AND MAGNETO-OPTICAL ELEMENT

TECHNICAL FIELD

The present invention relates to Faraday rotators and magneto-optical devices.

BACKGROUND ART

Optical isolators are magneto-optical devices that propagate light in a single direction and block reflected return light. The optical isolators are used in laser oscillators for use in optical communication systems, laser processing systems, and so on.

Conventionally, the wavelength range for use in optical communication systems is mainly from 1300 nm to 1700 nm and rare-earth iron garnet is used as Faraday elements of Faraday rotators in the optical isolators.

On the other hand, the wavelengths for use in laser processing and the like are shorter than the optical communication band and are mainly at around 1000 nm. In this wavelength range, rare-earth iron garnet described above exhibits high light absorption and, therefore, cannot be used. For this reason, Faraday elements made of paramagnetic material crystals are generally used and, particularly, terbium gallium garnet (TGG) is widely known.

In order to use a Faraday element in an optical isolator, its rotation angle (θ) due to Faraday rotation needs to be 45°. This Faraday rotation angle has a relationship described by the following Equation (1) with the length (L) of a Faraday element, a Verdet constant (V), and a magnetic flux density (H) parallel to the optical axis.

$$\theta = V \cdot H \cdot L \quad \text{Equation (1)}$$

In this equation, the Verdet constant is a characteristic depending upon the material. Therefore, in order to adjust the Faraday rotation angle, it is necessary to change the length of the Faraday element and the magnetic flux density applied in parallel with the optical axis to the Faraday element. Particularly, because of recent demand for size reduction of devices, the magnetic flux density applied to the Faraday rotator is being improved not by adjusting the sizes of the Faraday element and the magnet, but by changing the structure of the magnet.

For example, Patent Literature 1 below discloses a Faraday rotator including: a magnetic circuit composed of first to third magnets; and a Faraday element. The first magnet is magnetized in a direction perpendicular to the optical axis and toward the optical axis. The second magnet is magnetized in a direction perpendicular to the optical axis and away from the optical axis. The third magnet is disposed between the above two magnets. The third magnet is magnetized in a direction parallel to the optical axis and from the second magnet toward the first magnet. This magnetic circuit is constructed so that the relationship L2/10≤L3≤L2 holds where L2 represents the length of the first and second magnets along the direction of the optical axis and L3 represents the length of the third along the direction of the optical axis.

CITATION LIST

Patent Literature

[PTL 1]
JP-A-2009-229802

SUMMARY OF INVENTION

Technical Problem

When a magnetic circuit is formed by the structure described in Patent Literature 1, two regions having the largest magnetic flux density are formed at around the junction between the first and third magnets and at around the junction between the second and third magnets. Furthermore, a region having a large and stable magnetic flux density is formed in an internal space of the third magnet connecting both the above two regions, the internal space having the same length as the third magnet.

In Patent Literature 1, a Faraday element having a larger size than the above region is used. The reason for this is that because a paramagnetic material crystal, such as TGG, has a small Verdet constant, the length of the Faraday element is also important in order to obtain a desired Faraday rotation angle. However, with the use of a Faraday element larger than the region exhibiting a stable magnetic flux density as described above, if the Faraday element is misaligned during production of a Faraday rotator, this may cause the magnetic flux density applied to the Faraday element to be biased. As a result, there arises a problem that variations in Faraday rotation angle become significant, so that a desired Faraday rotation angle is difficult to obtain stably.

The present invention has been made in view of the above problem and, therefore, has an object of providing a Faraday rotator and a magneto-optical device which stably provide a Faraday rotation angle of 45° and achieve further size reduction.

Solution to Problem

A Faraday rotator according to the present invention comprises: a magnetic circuit including first to third magnetic materials each provided with a through hole through which light passes; and a Faraday element disposed in the through hole and made of a paramagnetic material capable of transmitting light therethrough, wherein the magnetic circuit is formed by coaxial arrangement of the first to third magnetic materials in this order in a front-to-rear direction, when a direction where light passes through the through hole in the magnetic circuit is defined as a direction of an optical axis, the first magnetic material is magnetized in a direction perpendicular to the direction of the optical axis to have a north pole located toward the through hole, the second magnetic material is magnetized in a direction parallel to the direction of the optical axis to have a north pole located toward the first magnetic material, and the third magnetic material is magnetized in a direction perpendicular to the direction of the optical axis to have a south pole located toward the through hole, and a length of the Faraday element along the direction of the optical axis is shorter than a length of the second magnetic material along the direction of the optical axis. With the above structure, regions having the largest magnetic flux density are formed at around the junction between the first and second magnetic materials and at around the junction between the second and third magnetic materials. Furthermore, since the length of the disposed Faraday element is shorter than the length of the second magnetic material along the direction of the optical axis, the entire Faraday element falls within a region having a stable magnetic flux density. Therefore, the Faraday element is less likely to be misaligned during assembly, so that variations in the Faraday rotation angle can be reduced.

In the Faraday rotator according to the present invention, the paramagnetic material is preferably a glass material.

In the Faraday rotator according to the present invention, the glass material preferably contains at least one rare earth element selected from among Ce, Pr, Nd, Pm, Sm, Eu, Gd, Tb, Dy, Ho, Er, and Tm. The glass material particularly preferably contains Tb.

In the Faraday rotator according to the present invention, the glass material preferably contains, in terms of oxide equivalent % by mole, more than 40% $Tb_2O_3$ and a proportion of $Tb^{3+}$ to a total amount of Tb is preferably 55% by mole or more. Such a glass material has a Verdet constant of 0.2 min/Oe·cm or more, which is larger than the Verdet constant (0.13 min/Oe·cm) of TGG conventionally used and therefore makes it easy to produce a smaller Faraday element.

In the Faraday rotator according to the present invention, the length of the Faraday element is preferably not less than 0.5 times but not more than 0.99 times the length of the second magnetic material along the direction of the optical axis.

In the Faraday rotator according to the present invention, the through hole in the magnetic circuit preferably has a cross-sectional area of 100 mm² or less. When the cross-sectional area of the through hole is 100 mm² or less, the magnetic flux density can be easily increased, so that the Faraday rotator can be more easily reduced in size.

A magneto-optical device according to the present invention comprises: the above-described Faraday rotator; a first optical component disposed at one end of the magnetic circuit of the Faraday rotator in the direction of the optical axis; and a second optical component disposed at the other end of the magnetic circuit in the direction of the optical axis, wherein light through the through hole in the magnetic circuit passes through the first optical component and the second optical component.

In the magneto-optical device according to the present invention, the first optical component and the second optical component may be polarizers.

Advantageous Effects of Invention

The present invention enables provision of a Faraday rotator and a magneto-optical device which stably provide a Faraday rotation angle of 45° and achieve further size reduction.

DESCRIPTION OF EMBODIMENTS

Hereinafter, a description will be given of a preferred embodiment. However, the following embodiment is merely illustrative and the present invention is not limited to the following embodiment. Throughout, the drawings, members having substantially the same functions may be referred to by the same reference characters.

(Faraday Rotator)

Figure 1:
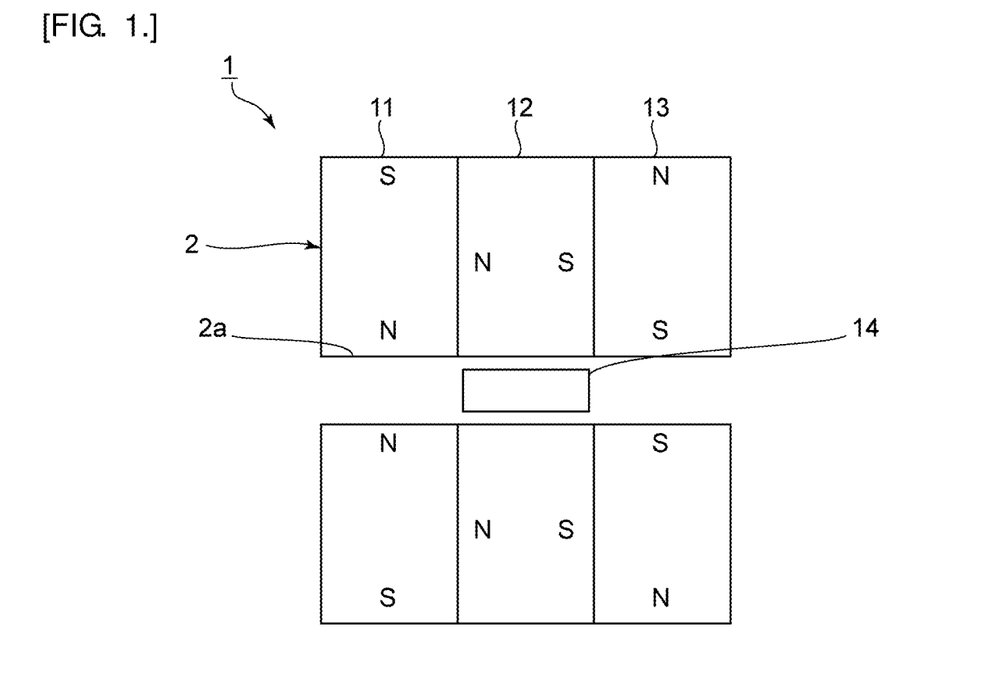
FIG. 1 is a schematic cross-sectional view showing an example of a structure of a Faraday rotator according to the present invention.

FIG. 1 is a schematic cross-sectional view showing an example of a structure of a Faraday rotator according to the present invention. The letters N and S in FIG. 1 represent magnetic poles. The same applies to the other drawings described hereinafter.

A Faraday rotator 1 is a device for use in a magneto-optical device, such as an optical isolator or an optical circulator. The Faraday rotator 1 comprises: a magnetic circuit 2 provided with a through hole 2a through which light passes; and a Faraday element 14 disposed in the through hole 2a. The Faraday element 14 is made of a paramagnetic material capable of transmitting light therethrough.

The magnetic circuit 2 includes a first magnetic material 11, a second magnetic material 12, and a third magnetic material 13, each provided with a through hole. The magnetic circuit 2 is formed by coaxial arrangement of the first magnetic material 11, the second magnetic material 12, and the third magnetic material 13 in this order in a front-to-rear direction. The term "coaxial arrangement" means that the above magnetic materials are arranged so that substantially their central portions are laid one on another as viewed in the direction of the optical axis. In this embodiment, the through hole 2a in the magnetic circuit 2 is formed by the connection of the respective through holes in the first magnetic material 11, the second magnetic material 12, and the third magnetic material 13 one to another.

In the magnetic circuit 2, the first magnetic material 11 and the third magnetic material 13 are magnetized in directions perpendicular to the direction of the optical axis and their magnetization directions are opposite to each other. Specifically, the first magnetic material 11 is magnetized in a direction perpendicular to the direction of the optical axis to have a north pole located toward the through hole. The third magnetic material 13 is magnetized in a direction perpendicular to the direction of the optical axis to have a south pole located toward the through hole. The second magnetic material 12 is magnetized in a direction parallel to the direction of the optical axis to have a north pole located toward the first magnetic material 11.

Light may be allowed to enter the Faraday rotator 1 first from the first magnetic material 11 or first from the third magnetic material 13.

The Faraday rotator 1 according to the present invention has a feature that the length of the disposed Faraday element 14 along the direction of the optical axis is shorter than the length of the second magnetic material 12 along the direction of the optical axis. Hereinafter, the length along the direction of the optical axis may also be described simply as the length.

The length of the Faraday element 14 is preferably not less than 0.5 times but not more than 0.99 times, more preferably not less than 0.7 times but not more than 0.95 times, and particularly preferably not less than 0.8 time but not more than 0.9 times the length of the second magnetic material 12. When a magnetic circuit as shown in FIG. 1 is formed, regions having the largest magnetic flux density are formed at around the junction between the first magnetic material 11 and the second magnetic material 12 and at around the junction between the second magnetic material 12 and the third magnetic material 13. Thus, since the length of the disposed Faraday element 14 is shorter than the length of the second magnetic material, the entire Faraday element 14 falls within a region having a large magnetic flux density. Therefore, even if the Faraday element 14 becomes misaligned during assembly, variations in Faraday rotation angle can be reduced. Furthermore, a magnetic field is efficiently applied to the entire Faraday element 14, so that even a short Faraday element or a small magnetic material can achieve a large Faraday rotation angle and, therefore, the Faraday rotator 1 and the magneto-optical device using the same can be further reduced in size. Hereinafter, the Faraday rotation angle may also be described as the rotation angle.

The cross-sectional area of the through hole 2a in the magnetic circuit 2 is preferably 100 mm$^2$ or less. If the cross-sectional area of the through hole 2a is too large, a sufficient magnetic flux density cannot be obtained. If the cross-sectional area of the through hole 2a is too small, the Faraday element 14 is difficult to dispose in the through hole 2a. The cross-sectional area of the through hole 2a is preferably 3 mm$^2$ to 80 mm$^2$, more preferably 4 mm$^2$ to 70 mm$^2$, still more preferably 5 mm$^2$ to 60 mm$^2$, and particularly preferably 7 mm$^2$ to 50 mm$^2$.

The cross-sectional shape of the through hole 2a in the magnetic circuit 2 is not particularly limited and may be rectangular or circular. The cross-sectional shape is preferably rectangular from the perspective of ease of assembly or preferably circular from the perspective of application of a uniform magnetic field. The cross-sectional shape of the Faraday element 14 and the cross-sectional shape of the through hole 2a in the magnetic circuit 2 do not necessarily coincide with each other, but preferably coincide with each other from the perspective of application of a uniform magnetic field.

Figure 2:
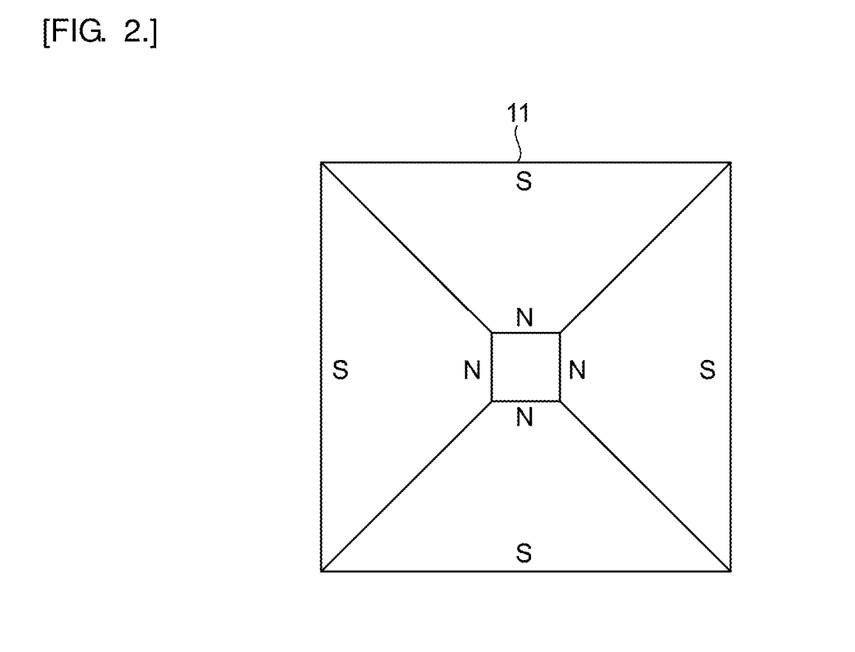
FIG. 2 is a view showing an example of a structure of a first magnetic material in the present invention.
Figure 3:
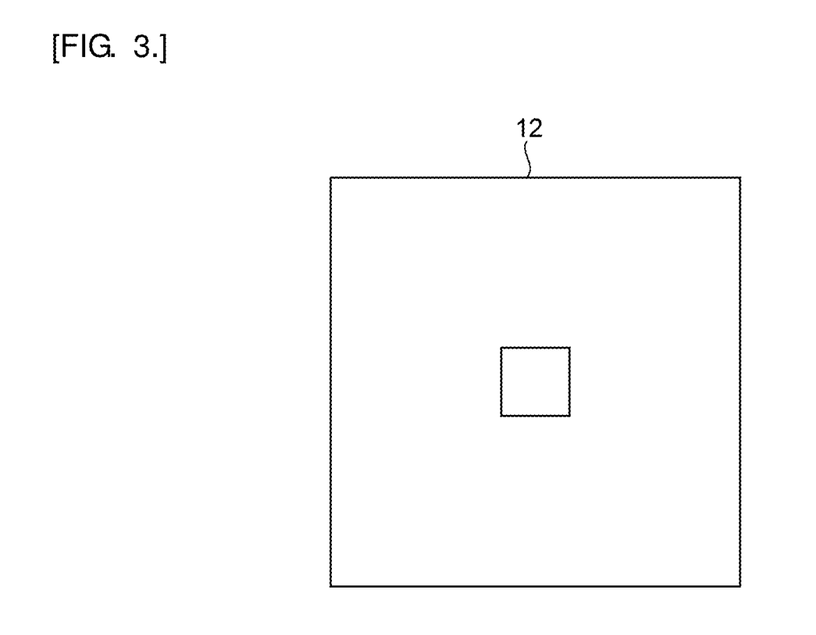
FIG. 3 is a view showing an example of a structure of a second magnetic material in the present invention.
Figure 4:
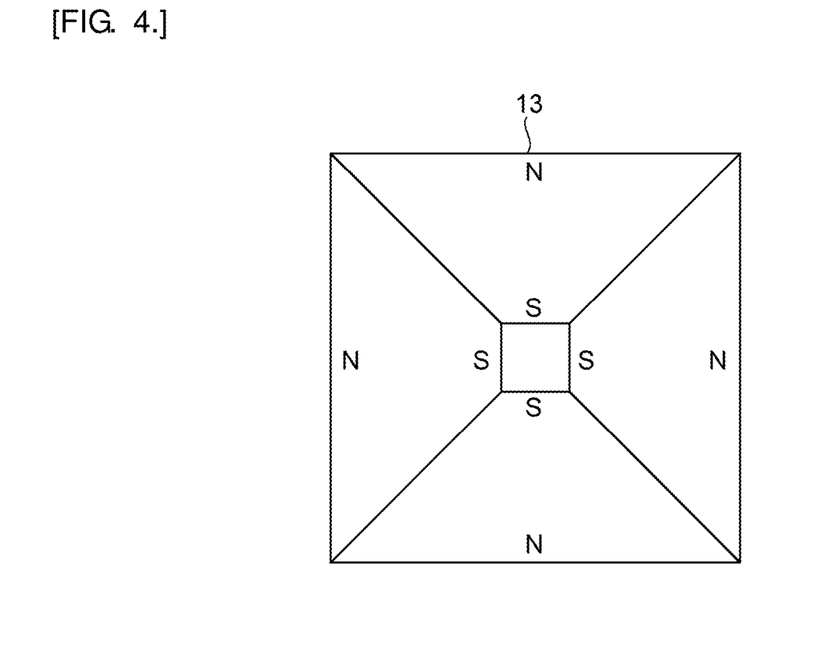
FIG. 4 is a view showing an example of a structure of a third magnetic material in the present invention.

FIG. 2 is a view showing an example of a structure of the first magnetic material. FIG. 3 is a view showing an example of a structure of the second magnetic material. FIG. 4 is a view showing an example of a structure of the third magnetic material.

The first magnetic material 11 shown in FIG. 2 is formed by combining four magnet pieces together. The number of magnet pieces constituting the first magnetic material 11 is not limited to the above. For example, the first magnetic material 11 may be formed by combining six or eight magnet pieces together. By forming the first magnetic material 11 in combination of a plurality of magnet pieces, the magnetic field can be effectively increased. However, the first magnetic material 11 may be constituted by a single magnet.

The second magnetic material 12 shown in FIG. 3 is constituted by a single magnet. However, the second magnetic material 12 may be formed by combining two or more magnet pieces together.

The third magnetic material 13 shown in FIG. 4 is, like the first magnetic material 11, formed by combining four magnet pieces together. However, the third magnetic material 13 may be formed by combining six or eight magnet pieces together or constituted by a single magnet.

The first magnetic material 11, the second magnetic material 12, and the third magnetic material 13 are each formed of a permanent magnet. Rare-earth magnets are particularly preferred as the permanent magnet and, of these, a magnet consisting mainly of samarium-cobalt (Sm—Co) or a magnet consisting mainly of neodymium-iron-boron (Nd—Fe—B) is preferred.

A paramagnetic material can be used as the Faraday element 14 in the present invention. Among paramagnetic materials, a glass material is preferably used. A Faraday element made of a glass material less causes variations in Verdet constant and reduction in extinction ratio due to defects and so on, which single-crystal materials would have, is less affected by stress from an adhesive material, and therefore can maintain a stable Verdet constant and a high extinction ratio. Alternatively, a paramagnetic material other than the glass material may be used as the Faraday element 14.

The glass material for use as the Faraday element 14 in the present invention preferably contains at least one rare earth element selected from among Ce, Pr, Nd, Pm, Sm, Eu, Gd, Tb, Dy, Ho, Er, and Tm. The glass material particularly preferably contains Tb.

The glass material for use as the Faraday element 14 in the present invention preferably contains, in terms of oxide equivalent % by mole, more than 40% $Tb_2O_3$, more preferably 45% or more $Tb_2O_3$, still more preferably 48% or more $Tb_2O_3$, yet still more preferably 49% or more $Tb_2O_3$, and particularly preferably 50% or more $Tb_2O_3$. When the content of $Tb_2O_3$ is large as just described, a good Faraday effect can be easily obtained. Tb in the glass is present in the trivalent or tetravalent state, but all of these Tb states are expressed as $Tb_2O_3$ herein.

In the glass material in the present invention, the proportion of $Tb^{3+}$ to the total amount of Tb is, in terms of % by mole, preferably 55% or more, more preferably 60% or more, still more preferably 70% or more, yet still more preferably 80% or more, even yet still more preferably 90% or more, and particularly preferably 95% or more. If the proportion of $Tb^{3+}$ to the total amount of Tb is too small, the light transmittance at wavelengths of 300 nm to 1100 nm is likely to decrease.

The Faraday element 14 in the present invention may further contain the following components. In the following description of the contents of components, "%" refers to "% by mole" unless otherwise specified.

$SiO_2$ is a component that forms a glass network and widens the vitrification range. However, this component does not contribute to increasing the Verdet constant. Therefore, if the content thereof is too large, a sufficient Faraday effect is less likely to be achieved. Hence, the content of $SiO_2$ is preferably 0% to 50% and particularly preferably 1% to 35%.

$B_2O_3$ is a component that forms a glass network and widens the vitrification range. However, $B_2O_3$ does not contribute to increasing the Verdet constant. Therefore, if the content thereof is too large, a sufficient Faraday effect is less likely to be achieved. Hence, the content of $B_2O_3$ is preferably 0% to 50% and particularly preferably 1% to 40%.

$P_2O_5$ is a component that forms a glass network and widens the vitrification range. However, $P_2O_5$ does not contribute to increasing the Verdet constant. Therefore, if the content thereof is too large, a sufficient Faraday effect is less likely to be achieved. Hence, the content of $P_2O_5$ is preferably 0% to 50% and particularly preferably 1% to 40%.

$Al_2O_3$ is a component that increases the glass formation ability. However, $Al_2O_3$ does not contribute to increasing the Verdet constant. Therefore, if the content thereof is too large, a sufficient Faraday effect is less likely to be achieved. Hence, the content of $Al_2O_3$ is preferably 0% to 50% and particularly preferably 0% to 30%.

$La_2O_3$, $Gd_2O_3$, and $Y_2O_3$ have the effect of making vitrification stable. However, an excessive large content thereof contrariwise makes vitrification difficult. Therefore, the content of each of $La_2O_3$, $Gd_2O_3$, and $Y_2O_3$ is preferably 10% or less and particularly preferably 5% or less.

$Dy_2O_3$, $Eu_2O_3$, and $Ce_2O_3$ make vitrification stable and contribute to increasing the Verdet constant. However, an excessive large content of them contrariwise makes vitrification difficult. Therefore, the content of each of $Dy_2O_3$, $Eu_2O_3$, and $Ce_2O_3$ is preferably 15% or less and particularly preferably 10% or less. Dy, Eu, and Ce in the glass are present in the trivalent or tetravalent state, but all of these states are herein expressed as $Dy_2O_3$, $Eu_2O_3$ or $Ce_2O_3$, respectively.

MgO, CaO, SrO, and BaO have the effect of making vitrification stable and increasing the chemical durability. However, these components do not contribute to increasing the Verdet constant. Therefore, if the content of them is too large, a sufficient Faraday effect is less likely to be achieved. Hence, the content of each of these components is preferably 0% to 10% and particularly preferably 0% to 5%.

$GeO_2$ is a component that increases the glass formation ability. However, $GeO_2$ does not contribute to increasing the Verdet constant. Therefore, if the content thereof is too large, a sufficient Faraday effect is less likely to be achieved. Hence, the content of $GeO_2$ is preferably 0% to 15%, more preferably 0% to 10%, and particularly preferably 0% to 9%.

$Ga_2O_3$ has the effect of increasing the glass formation ability and widening the vitrification range. However, an excessive large content thereof is likely to cause devitrification. Furthermore, $Ga_2O_3$ does not contribute to increasing the Verdet constant. Therefore, if its content is too large, a sufficient Faraday effect is less likely to be achieved. Hence, the content of $Ga_2O_3$ is preferably 0% to 6% and particularly preferably 0% to 5%.

Fluorine has the effect of increasing the glass formation ability and widening the vitrification range. However, if its content is too large, fluorine volatilizes during melting, which may cause a composition variation to have an adverse influence on vitrification. Furthermore, striae are likely to increase. Therefore, the content of fluorine (in terms of $F_2$ equivalent) is preferably 0% to 10%, more preferably 0% to 7%, and particularly preferably 0% to 5%.

$Sb_2O_3$ may be added as a reductant. However, in order to avoid coloration or in consideration of environmental burden, the content thereof is preferably 0.1% or less.

The Faraday element in the present invention exhibits good light transmission properties within a wavelength range of 300 nm to 1100 nm. Specifically, the transmittance at a wavelength of 1064 nm and an optical path length of 1 mm is preferably 60% or more, more preferably 70% or more, and particularly preferably 80% or more. Furthermore, the transmittance at a wavelength of 633 nm and an optical path length of 1 mm is preferably 30% or more, more preferably 50% or more, still more preferably 70% or more, and particularly preferably 80% or more. Moreover, the transmittance at a wavelength of 533 nm and an optical path length of 1 mm is preferably 30% or more, more preferably 50% or more, still more preferably 70% or more, and particularly preferably 80% or more.

The cross-sectional shape of the Faraday element 14 in the present invention is not particularly limited, but is preferably circular in order to provide a uniform Faraday effect. The diameter of the Faraday element 14 is preferably 10 mm or less, more preferably 8 mm or less, still more preferably 5 mm or less, and particularly preferably 3.5 mm or less. If the diameter of the Faraday element 14 is too large, it cannot be disposed within the through hole 2a in the magnetic circuit 2. Otherwise, it is necessary to increase the size of the magnetic circuit, which makes it difficult to reduce the size of the Faraday rotator. The lower limit of the diameter of the Faraday element 14 is not particularly limited, but it is, actually, not less than 0.5 mm.

The length of the Faraday element 14 in the present invention is preferably 2 mm to 15 mm, more preferably 3 mm to 14 mm, still more preferably 4 mm to 13 mm, yet still more preferably 5 mm to 12 mm, and even yet still more preferably 6 mm to 11 mm. If the Faraday element 14 is too short, this needs to enlarge the magnetic field in order to obtain a rotation angle of 45°, i.e., enlarge the magnetic circuit 2, which makes it difficult to reduce the size of the Faraday rotator 1. On the other hand, if the Faraday element 14 is too long, this needs to extend the second magnetic material 12, which makes it difficult to reduce the size of the Faraday rotator 1.

The Faraday rotator 1 according to the present invention is preferably used within a wavelength range of 350 nm to 1300 nm, more preferably within a wavelength range of 450 nm to 1200 nm, still more preferably within a range of 500 nm to 1200 nm, yet still more preferably within a wavelength range of 800 nm to 1100 nm, and particularly preferably within a wavelength range of 900 nm to 1100 nm.

(Magneto-Optical Device)

Figure 5:
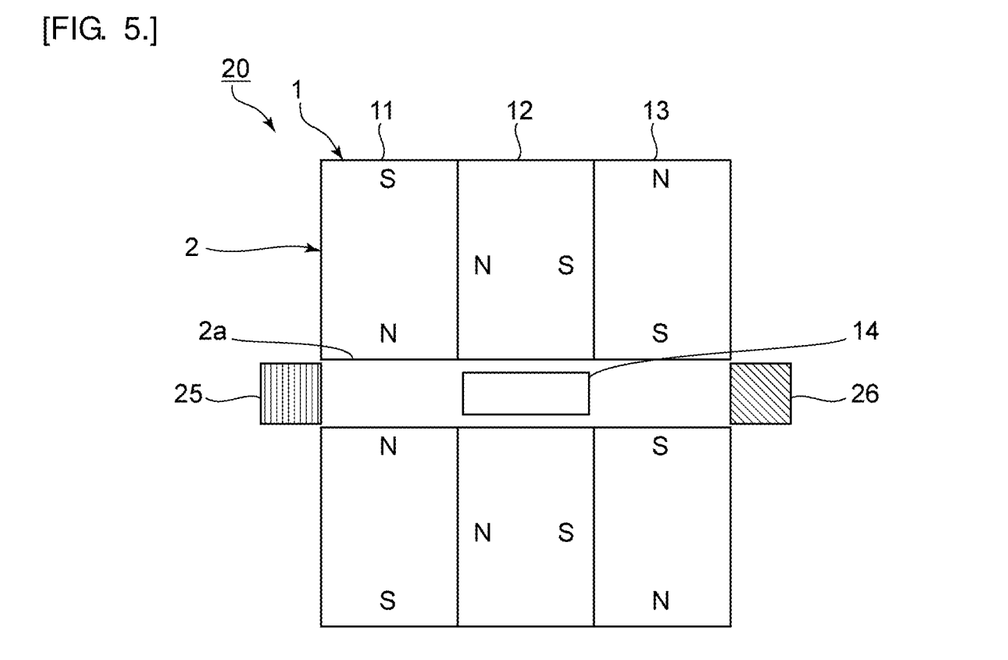
FIG. 5 is a schematic cross-sectional view showing an example of a structure of a magneto-optical device according to the present invention.

FIG. 5 is a schematic cross-sectional view showing an example of a structure of a magneto-optical device according to the present invention.

A magneto-optical device 20 shown in FIG. 5 is an optical isolator. The optical isolator is a device that blocks reflected return light of laser light. The magneto-optical device 20 comprises: the Faraday rotator 1 shown in FIG. 1; a first optical component 25 disposed at one end of the magnetic circuit 2 in the direction of the optical axis; and a second optical component 26 disposed at the other end of the magnetic circuit 2 in the direction of the optical axis. In this embodiment, the first optical component 25 and the second optical component 26 are polarizers. The axis of the second optical component 26 along which light passes through is inclined at 45° to the axis of the first optical component 25 along which light passes through.

Light incident on the magneto-optical device 20 passes through the first optical component 25, is converted to linearly polarized light, and then enters the Faraday element 14. The light having entered the Faraday element 14 is rotated 45° by the Faraday element 14 and then passes through the second optical component 26. Part of the light having passed through the second optical component 26 becomes reflected return light and passes through the second optical component 26, with a plane of polarization rotated at an angle of 45°. The reflected return light having passed through the second optical component 26 is further rotated 45° by the Faraday element 14 and thus has a perpendicular plane of polarization inclined 90° to the axis of the first optical component 25 along which light passes through. Therefore, the reflected return light cannot passes through the first optical component 25 and is blocked.

Since the magneto-optical device 20 according to the present invention includes the Faraday rotator 1 according to the present invention shown in FIG. 1, it can stably provide a Faraday rotation angle of 45° and can be reduced in size.

Although the magneto-optical device 20 shown in FIG. 5 is an optical isolator, the magneto-optical device 20 may be an optical circulator. In this case, the first optical component 25 and the second optical component 26 may be a wavelength plate or a beam splitter. The magneto-optical device 20 may be a magneto-optical device other than the optical isolator and the optical circulator.

EXAMPLES

The present invention will be described below with reference to working examples, but the present invention is not limited by these working examples.

Although in these working examples a Faraday rotator at a wavelength of 1064 nm is taken as an example, the present invention is not limited to this wavelength.

Example 1

A Faraday element in Example 1 was produced in the following manner. First, glass raw materials were pressed into shape and then sintered at 700° C. to 1400° C. for six hours, thus producing a glass raw material block. The glass raw material block was produced to have a glass composition of $55Tb_2O_3\text{-}10Al_2O_3\text{-}35B_2O_3$.

Next, the glass raw material block was coarsely ground into small pieces using a mortar. Using the obtained small pieces of glass raw material block, a glass material was produced by a containerless levitation technique. A 100 W $CO_2$ laser oscillator was used as a heat source. Furthermore, nitrogen gas was used as a gas for levitating the glass raw material block and fed at a flow rate of 1 L/min to 30 L/min.

The obtained glass material was thermally treated in an atmosphere of $4\%\text{-}H_2/N_2$ at 800° C. for 10 hours.

The proportion of $Tb^{3+}$ to the total amount of Tb was measured with an X-ray photoelectron spectroscopic analyzer (XPS). Specifically, for the obtained glass material, the proportion of $Tb^{3+}$ to the total amount of Tb was calculated from the peak intensity ratio of each Tb ion measured with the XPS. As a result, the proportion of $Tb^{3+}$ was 99% or more.

The obtained glass material was measured in terms of Verdet constant. The Verdet constant was measured by the rotating analyzer method. Specifically, the obtained glass material was polished to have a thickness of 1 mm, the obtained piece was measured in terms of Faraday rotation angle at a wavelength of 1064 nm in a magnetic field of 10 kOe, and the Verdet constant was then calculated. The measured Verdet constant was 0.204 min/Oe·cm to 0.212 min/Oe·cm.

Next, the obtained glass was cut and polished, thus obtaining a columnar Faraday element having a diameter ϕ of 3 mm and a length of 9.6 mm. Its extinction ratio was 42 dB. In Examples and Comparative Examples herein, the length refers to the length of the Faraday rotator along the direction of the optical axis.

Sm—Co magnet was used as permanent magnet constituting each of the first to third magnetic materials. The outside diameters ϕ of the first to third magnetic materials were 32 mm and the diameter ϕ of the through hole was 4 mm. The length of the first magnetic material was 9.9 mm, the length of the second magnetic material was 10 mm, and the length of the third magnetic material was 9.9 mm.

The Faraday element obtained in the above manner was combined with the first to third magnetic materials, thus forming a Faraday rotator.

Example 2

A Faraday rotator was produced in the same manner as in Example 1 except that the length of the first magnetic material was 20 mm, the length of the second magnetic material was 21 mm, the length of the third magnetic material was 20 mm, and the length of the Faraday element was 14.9 mm.

Example 3

A Faraday rotator was produced in the same manner as in Example 1 except that the length of the first magnetic material was 13 mm, the length of the second magnetic material was 10 mm, the length of the third magnetic material was 13 mm, and the length of the Faraday element was 9.3 mm.

Example 4

A Faraday rotator was produced in the same manner as in Example 1 except that Nd—Fe—B magnet was used as the permanent magnet constituting each of the first to third magnetic materials and the length of the Faraday element was 9 mm.

Example 5

A Faraday rotator was produced in the same manner as in Example 4 except that the length of the first magnetic material was 10 mm, the length of the second magnetic material was 7 mm, the length of the third magnetic material was 10 mm, and the length of the Faraday element was 6.3 mm.

Example 6

A Faraday rotator was produced in the same manner as in Example 4 except that the length of the first magnetic material was 20 mm, the length of the second magnetic material was 21 mm, the length of the third magnetic material was 20 mm, and the length of the Faraday element was 12 mm.

Comparative Example 1

A Faraday rotator was produced in the same manner as in Example 1 except that the length of the Faraday element was 16 mm.

Comparative Example 2

A Faraday rotator was produced in the same manner as in Comparative Example 1 except that TGG single crystals produced by the Czochralski method were used as the Faraday element. When the Verdet constant of the Faraday element was measured, it was 0.125 min/Oe·cm to 0.134 min/Oe·cm.

Comparative Example 3

A Faraday rotator was produced in the same manner as in Comparative Example 2 except that Nd—Fe—B magnet was used as the permanent magnet constituting each of the first to third magnetic materials.

Variations in the rotation angle were determined by producing each of the above Faraday rotators in sets of ten and measuring each set of ten Faraday rotators in terms of rotation angle. The results of measurement of variations in rotation angle are shown in Table 1 below. In Table 1, the length of the first magnetic material is represented by a, the length of the second magnetic material is represented by b, the length of the third magnetic material is represented by c, the length of the Faraday element is represented by L, and the Verdet constant at a wavelength of 1064 nm is represented by V.

TABLE 1

| | | First to Third Magnetic Materials | | | Faraday Element | | | Variations in |
|---|---|---|---|---|---|---|---|---|
| | Magnet Type | a (mm) | b (mm) | c (mm) | L (mm) | V (min/Oe · cm) | L/b | Rotation Angle (°) |
| Ex. 1 | Sm—Co | 9.9 | 10 | 9.9 | 9.6 | 0.204-0.212 | 0.96 | ±0.6 |
| Ex. 2 | Sm—Co | 20 | 21 | 20 | 14.9 | 0.204-0.212 | 0.71 | ±0.5 |
| Ex. 3 | Sm—Co | 13 | 10 | 13 | 9.3 | 0.204-0.212 | 0.93 | ±0.6 |
| Ex. 4 | Nd—Fe—B | 9.9 | 10 | 9.9 | 9 | 0.204-0.212 | 0.9 | ±0.5 |
| Ex. 5 | Nd—Fe—B | 10 | 7 | 10 | 6.3 | 0.204-0.212 | 0.9 | ±0.5 |
| Ex. 6 | Nd—Fe—B | 20 | 21 | 20 | 12 | 0.204-0.212 | 0.57 | ±0.4 |
| Comp. Ex. 1 | Sm—Co | 9.9 | 10 | 9.9 | 16 | 0.204-0.212 | 1.6 | ±1.1 |
| Comp. Ex. 2 | Sm—Co | 9.9 | 10 | 9.9 | 16 | 0.125-0.134 | 1.6 | ±1.8 |
| Comp. Ex. 3 | Nd—Fe—B | 9.9 | 10 | 9.9 | 16 | 0.125-0.134 | 1.6 | ±1.9 |

In Examples 1 to 6, variations in rotation angle were within ±0.6° and, therefore, Faraday rotators having less variations in rotation angle were obtained.

In Comparative Example 1, variations in rotation angle were ±1.1°, which were larger than those in Examples 1 to 6.

Variations in rotation angle in Comparative Example 2 were ±1.8, and variations in rotation angle in Comparative Example 3 were ±1.9°. As seen from this, in Comparative Examples 2 and 3, the rotation angle significantly varied. This can be attributed to misalignment of the Faraday element when the Faraday element and the first to third magnetic materials were assembled, and to variations in Verdet constant of the TGG single crystals.

In Comparative Examples 2 and 3, the sizes of the first to third magnetic materials were equal to those in Examples 1 and 4, but the rotation angle did not reach 45° because of a small Verdet constant. In contrast, in Examples 1 and 4, the rotation angle reached 45°.

REFERENCE SIGNS LIST

1 . . . Faraday rotator
2 . . . magnetic circuit
2a . . . through hole
11 . . . first magnetic material
12 . . . second magnetic material
13 . . . third magnetic material
14 . . . Faraday element
20 . . . magneto-optical device
25 . . . first optical component
26 . . . second optical component

The invention claimed is:

1. A Faraday rotator comprising:
a magnetic circuit including first to third magnetic materials each provided with a through hole through which light passes; and
a Faraday element disposed in the through hole and made of a paramagnetic material capable of transmitting light therethrough,
wherein the magnetic circuit is formed by coaxial arrangement of the first to third magnetic materials in this order in a front-to-rear direction,
when a direction where light passes through the through hole in the magnetic circuit is defined as a direction of an optical axis, the first magnetic material is magnetized in a direction perpendicular to the direction of the optical axis to have a north pole located toward the through hole, the second magnetic material is magnetized in a direction parallel to the direction of the optical axis to have a north pole located toward the first magnetic material, and the third magnetic material is magnetized in a direction perpendicular to the direction of the optical axis to have a south pole located toward the through hole, and
a length of the Faraday element along the direction of the optical axis is not less than 0.5 times but not more than 0.9 times a length of the second magnetic material along the direction of the optical axis.

2. The Faraday rotator according to claim 1, wherein the paramagnetic material is a glass material.

3. The Faraday rotator according to claim 2, wherein the glass material contains at least one rare earth element selected from among Ce, Pr, Nd, Pm, Sm, Eu, Gd, Tb, Dy, Ho, Er, and Tm.

4. The Faraday rotator according to claim 3, wherein the glass material contains Tb.

5. The Faraday rotator according to claim 2, wherein the glass material contains, in terms of oxide equivalent % by mole, more than 40% $Tb_2O_3$ and a proportion of $Tb^{3+}$ to a total amount of Tb is 55% by mole or more.

6. The Faraday rotator according to claim 1, wherein the through hole in the magnetic circuit has a cross-sectional area of 100 $mm^2$ or less.

7. A magneto-optical device comprising:
the Faraday rotator according to claim 1;
a first optical component disposed at one end of the magnetic circuit of the Faraday rotator in the direction of the optical axis; and
a second optical component disposed at the other end of the magnetic circuit in the direction of the optical axis,
wherein light through the through hole in the magnetic circuit passes through the first optical component and the second optical component.

8. The magneto-optical device according to claim 7, wherein the first optical component and the second optical component are polarizers.

* * * * *